April 1, 1969 J. V. GREGG, SR 3,436,024
COMBINATION SPRAY HEAD AND SCREEN FILTER
Filed March 20, 1967
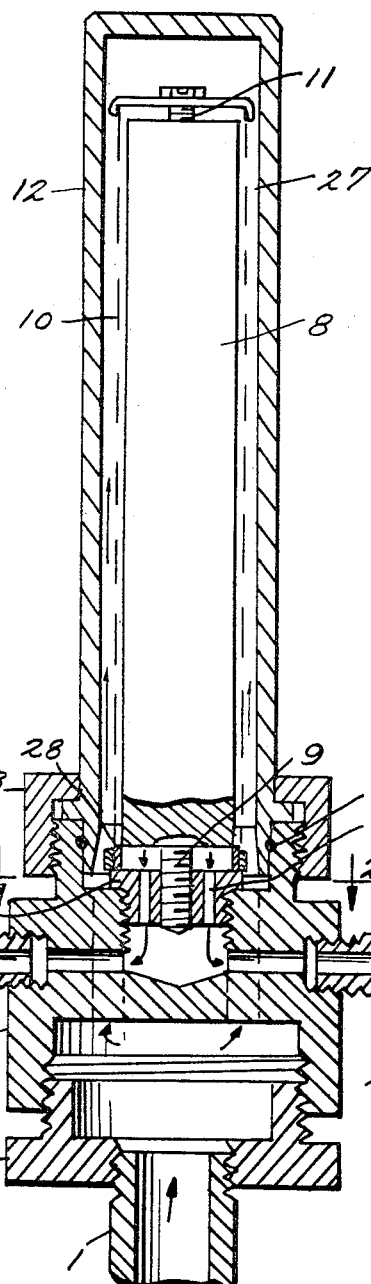
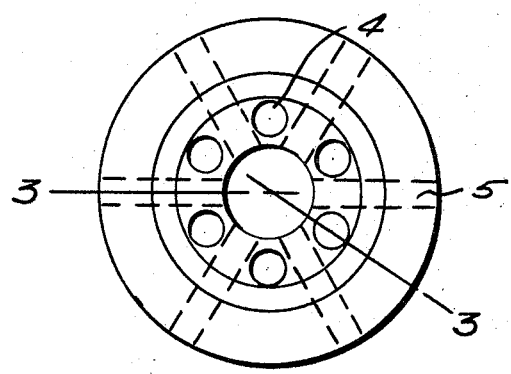
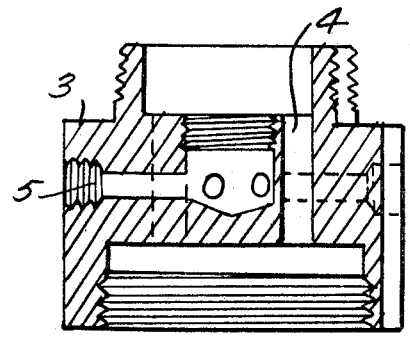
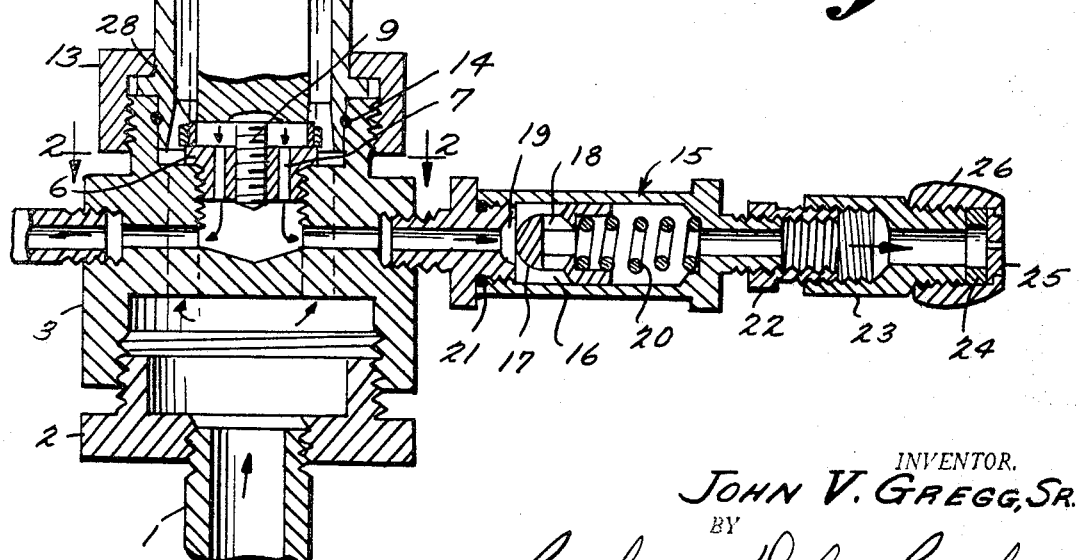
INVENTOR.
JOHN V. GREGG, SR.
BY
Cushman, Darby & Cushman
ATTORNEYS

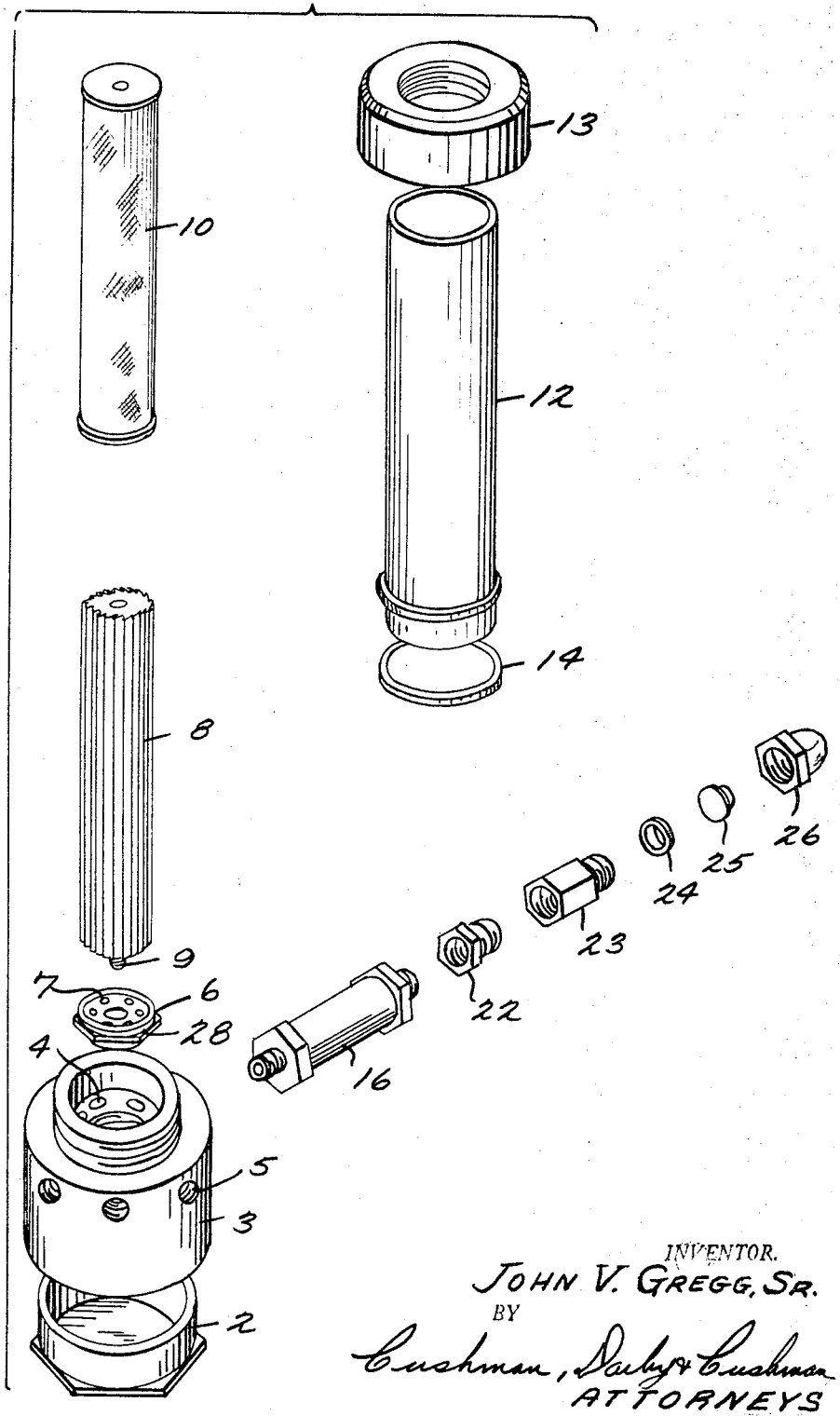

United States Patent Office 3,436,024
Patented Apr. 1, 1969

3,436,024
COMBINATION SPRAY HEAD AND SCREEN FILTER
John V. Gregg, Sr., Kansas City, Mo., assignor to Cook Paint & Varnish Company, Kansas City, Mo., a corporation of Delaware
Filed Mar. 20, 1967, Ser. No. 624,474
Int. Cl. B05b 1/14
U.S. Cl. 239—553.3                               5 Claims

ABSTRACT OF THE DISCLOSURE

A spray coating apparatus in which a central filtering screen is provided for a plurality of circularly arranged nozzles. Fluid is introduced via a supply conduit to a first group of vertically-oriented passageways or conduits in a two-way manifold. As the fluid stream passes through these passageways, it is separated into a plurality of streams which are projected upwardly into the filter chamber at spaced intervals around the circumference of a cylindrical screen filter. After filtering, the fluid flows back to the manifold and passes through a second group of passageways in said manifold which are horizontally oriented with respect to the first group. The filtered fluid is then discharged through the spray nozzles.

Brief description of invention

This invention relates to an improvement in spray coating apparatus in which a central or common filter is provided for a plurality of circularly arranged spray nozzles.

The invention may be employed in high-pressure hydraulic spray units used primarily for coating the interior of steel tubing which is utilized in gas, water and fuel oil transmission lines.

The usual method of applying coating is by the employment of a plurality of spray nozzles which are fed by a common supply pipe or conduit. See, for example, the patent to Heath 876,453 and British Patent 253,212. When filtering means are used, a filter is provided for each of the individual spray nozzles, as in Munson 2,629,632. There are several disadvantages associated with the Munson filter arrangement however, particularly if one attempts to incorporate the concept of an individual filter in each of a plurality of circularly-arranged spray nozzles, as disclosed in Heath or in British Patent 253,212.

For example, due to inherent size limitations, the small filter screens, when situated in the spray nozzle proper, would repeatedly become clogged with dirt and other contaminates, thus causing many repair and replacement delays.

In addition, the fluid spray experiences an excessive pressure drop due to back pressures which develop because of the presence of the filter within the nozzle, thus causing improper atomization and non-uniform coating film on the surface being coated.

A further disadvantage is that total filter area is quite limited when the filter is located within the spray nozzle proper.

Moreover, in a filter arrangement as disclosed in Munson only approximately half of the filter area is effectively utilized because of the manner in which the filters are positioned in the main fluid conduit.

The aforementioned drawbacks are obviated by the instant invention. The provision of a single central filter precludes excessive pressure drop in the spray discharge area, and the structure and positioning of the filter is such that appreciably greater filter area is available, as opposed to locating the filter within the nozzle.

Additionally, the present filter can be easily removed and replaced without disasssembling the spray head itself.

Furthermore, the fact that the fluid to be filtered is divided by the manifold structure into a plurality of streams which are projected upwardly into the filter chamber at spaced intervals around the circumference of the cylindrical screen filter results in optimum utilization of total filter area as opposed to the Munson filter arrangement.

In addition to the advantages mentioned above, other advantages of this invention will become apparent in the more detailed discussion which follows.

In the more detailed discussion of the invention, reference will be made to the accompanying drawings in which:

FIGURE 1 is a cross-sectional elevational view of the two-way manifold, strainer, and one spray nozzle;

FIGURE 2 is a top plan view of the two-way manifold, as seen from line 2—2 of FIGURE 1;

FIGURE 3 is an elevational section taken along line 3—3 of FIGURE 2; and

FIGURE 4 is an exploded perspective view of the spray coating apparatus.

Detailed discussion of invention

Referring to the drawings, the spray coating apparatus includes a fluid conduit 1 through which the coating is supplied from any suitable source (not shown). The conduit 1 is screwed into a bushing 2, which in turn is affixed to a two-way manifold 3.

Referring specifically to FIGURES 2 and 3, the manifold 3 contains a first group of vertically-oriented fluid passageways or conduits 4, and a second group of passageways 5, which are horizontally-oriented with respect to the passageways 4 and are located in spaced or staggered relation thereto. The function of the passageways 4 is to break up or separate the introduced fluid into a plurality of fluid streams which are projected upwardly at spaced intervals around the circumference of the cylindrical filter screen, whereas the purpose of the passageways 5 is to distribute the filtered fluid to the spray nozzles for discharge therethrough.

An adapter 6 is screwed into the manifold 3 and is provided with a series of vertically-oriented orifices 7. A longitudinally channeled stud 8 is threadedly engaged with the adapter 6 by means of screw 9. The stud 8, which may be cylindrical, has dimensions such that its widest diameter is less than the diameter of the collar 28 of the adapter 6, thus allowing fluid to flow freely from the channels of stud 8 to the orifices 7. A filter or strainer 10, which may be a 60 mesh cylindrical screen, encases stud 8 and is removably secured thereto by screw 11. Filter 10 is in turn encased by chamber cowl 12, which is removably secured and sealed to manifold 3 by a chamber retaining nut 13. An O-ring 14 is positioned between chamber cowl 12 and manifold 3 in order to ensure a fluid seal. The structural relation of filter 10 and cowl 12 is such that a filter chamber 27 is formed therebetween. The chamber 27 functions as an area of confinement for the plurality of liquid streams which issue from the passageways 4 when a liquid is conveyed into the manifold under pressure from a suitable source of supply.

One of a plurality of circularly arranged spray nozzles is generally indicated at 15. In this embodiment of the invention, a total of six nozzles are utilized, although the number may be varied. A spray nozzle 15 is threadedly engaged with each passageway 5 and is thus in fluid communication with manifold 3. The nozzle 15 includes a 100 p.s.i. check valve 16, which includes a valve closure member 17 containing openings 18 for the passage of fluid therethrough and which is biased towards valve seat 19 by helical spring 20. An O-ring 21 provides a fluid seal for the check valve 16. The nozzle 15 additionally includes a bushing 22 which is threadedly secured at one end to the check valve 16 and at the other end to an adapter 23. A gasket 24 and a tip member 25 are removably received within a tip retaining nut 26, which is threadedly engaged to adapter 22.

The operation of the apparatus is as follows:

Fluid is conducted from conduit 1 to manifold 3, where passageways 4 divide the fluid flow into a plurality of upwardly directed jets or streams which are disposed in the filter chamber 27 at approximately equally spaced intervals around the filter 10. The fluid is filtered through strainer 10 and flows downwardly in the channels of stud 8 to the adapter orifices 7. The fluid then passes through adapter orifices 7 and into the passageways 5. The pressure of the fluid overcomes spring 20, thus unseating valve closure member 17 and allowing the fluid to pass through openings 18 to the tip member 25, where the fluid coating is discharged and is deposited on the object which is to be coated.

Should the screen 10 become plugged, the operator simply removes chamber retaining nut 13 by hand, slides off the cowl 12, and disengages screw 11 with a screwdriver. Thus, the screen 10 is readily removable for cleaning or replacement with a minimum of effort, and without resorting to disassembly of the spray nozzles.

Thus, it is apparent that this invention constitutes a substantial improvement over existing devices. The employment of a readily removable common filter in conjunction with a plurality of spray nozzles results in greater filter area and a lower incidence of filter maintenance as compared to prior systems. Also, the use of a common filter eliminates the pressure drop due to back pressure in the nozzles of the prior art devices. In addition, the provision for dividing the fluid to be filtered into a plurality of circumferentially spaced streams ensures maximum utilization of the effective area of the cylindrical filter.

What is claimed is:

1. In a spray-coating apparatus which filters a fluid before distributing the same to a surface to be coated, the combination comprising a two-way manifold having (a) an inlet, connected to a supply conduit, for receiving a flow of fluid from a source of supply, (b) a plurality of fluid passageways which are in open communication with the inlet and which divide the inlet flow of fluid into a plurality of separate streams before the fluid is filtered, and (c) a plurality of outlets which receive a uniform distribution of filtered fluid for distribution to a surface to be coated, a filter chamber in open communication with said two-way manifold, said filter chamber having included therein a cylindrical filtering element which is positioned so that said plurality of fluid passageways of said two-way manifold divide the inlet flow of fluid into a plurality of streams which surround the cylindrical filtering element and which flow along the length of and through the filtering element, and a stud means positioned within said cylindrical filtering element for supporting the filtering element, said stud means having closely spaced channels formed longitudinally into its outer surface so that filtered fluid can flow along an inside surface of the filtering element and to said plurality of outlets carried in said two-way manifold.

2. The apparatus of claim 1 wherein said cylindrical filtering element comprises a cylindrical mesh screen.

3. The combination of claim 2 and including a cowling member which is removably secured to said manifold so that said cylindrical screen may be serviced by simply removing said cowling member.

4. The apparatus of claim 2 and including a nozzle means in communication with each of said plurality of outlets.

5. The apparatus of claim 1 wherein said plurality of passageways are arranged in a circle around a base end of said filtering element.

References Cited

UNITED STATES PATENTS

| 1,609,430 | 12/1926 | Schlesinger | 239—590.3 |
| 2,888,141 | 5/1959 | Coates et al. | 210—440 |
| 3,282,434 | 11/1966 | Pall | 210—440 |

EVERETT W. KIRBY, *Primary Examiner.*

U.S. Cl. X.R.

239—590.3, 315; 210—440